(12) United States Patent
Hutchenson et al.

(10) Patent No.: US 12,509,433 B2
(45) Date of Patent: Dec. 30, 2025

(54) PROCESS FOR THE PRODUCTION OF FURFURAL USING A WATER IMMISCIBLE ORGANIC SOLVENT

(71) Applicant: COVATION INC., Newark, DE (US)

(72) Inventors: Keith W Hutchenson, Lincoln University, PA (US); Torren Ryan Carlson, Newark, DE (US); Jacob G Dickinson, Wilmington, DE (US); David William Drew, Newark, DE (US); Paul Joseph Fagan, Wilmington, DE (US); Francis G Gallagher, Wilmington, DE (US); Isabel Liberis, Pomona, NY (US); Kenneth E Mersman, Newark, NY (US); Gregg Sunshine, Wilmington, DE (US)

(73) Assignee: Covation Inc., Newark, DE (US)

( * ) Notice: Subject to any disclaimer, the term of this patent is extended or adjusted under 35 U.S.C. 154(b) by 0 days.

(21) Appl. No.: 17/729,287

(22) Filed: Apr. 26, 2022

(65) Prior Publication Data
US 2022/0259166 A1    Aug. 18, 2022

Related U.S. Application Data

(63) Continuation of application No. 16/950,172, filed on Nov. 17, 2020, now abandoned, which is a continuation of application No. 16/818,645, filed on Mar. 13, 2020, now abandoned, which is a continuation of application No. 16/303,005, filed as application No. PCT/US2017/035626 on Jun. 2, 2017, now abandoned.

(60) Provisional application No. 62/345,031, filed on Jun. 3, 2016.

(51) Int. Cl.
*C07D 307/50* (2006.01)
*C07D 307/48* (2006.01)

(52) U.S. Cl.
CPC ......... *C07D 307/50* (2013.01); *C07D 307/48* (2013.01)

(58) Field of Classification Search
CPC .................................................... C07D 307/50
See application file for complete search history.

(56) References Cited

FOREIGN PATENT DOCUMENTS

| WO | 2012162001 | 11/2012 |
|----|------------|---------|
| WO | 2016025679 | 2/2016  |

OTHER PUBLICATIONS

International Search Report and Written Opinion dated Jul. 19, 2017 in International Application No. PCT/US2017/035626.

*Primary Examiner* — John S Kenyon
(74) *Attorney, Agent, or Firm* — Xiaoying Zhang; Zhang Technology Law, LLC

(57) ABSTRACT

The disclosure relates to an efficient process for the production of a furan derivative from C5 and/or C6 sugars. The process utilizes a water immiscible organic solvent system comprising at least one alkyl phenol and at least one alkylated naphthalene.

11 Claims, No Drawings

PROCESS FOR THE PRODUCTION OF FURFURAL USING A WATER IMMISCIBLE ORGANIC SOLVENT

FIELD OF THE DISCLOSURE

The present disclosure is directed towards the production of furan derivatives, especially, furfural, 5-hydroxymethyl-furfural, and furfuryl alcohol from C5 and C6 sugars.

CROSS-REFERENCE TO RELATED APPLICATION

This application is a continuation of U.S. patent application Ser. No. 16/950,172, filed Nov. 17, 2020 which is a continuation of U.S. patent application Ser. No. 16/818,645, filed Mar. 13, 2020 which is a continuation of U.S. patent application Ser. No. 16/303,005, filed Nov. 19, 2018 which is a 371 of International Patent Application No. PCT/US17/35626, filed on Jun. 2, 2017 which claims the benefit of U.S. Provisional Application No. 62/345,031, filed Jun. 3, 2016, the entire disclosure of which is incorporated herein by reference.

BACKGROUND OF THE DISCLOSURE

Furfural and related compounds, such as 5-hydroxymethyl furfural (HMF), are useful precursors and starting materials for industrial chemicals for use as pharmaceuticals, herbicides, stabilizers, fuels, fuel additives and polymers. The current furfural manufacturing process utilizes various biomass, for example, corn cobs, sugar cane bagasse, bamboo, saw dust, wood chippings and oat hulls as a raw material feed stock.

The biomass is hydrolyzed under acidic conditions to its monomer C5 and/or C6 sugars, such as glucose, fructose, xylose, mannose, galactose, rhamnose, and arabinose. Xylose, which is a pentose (a C5 sugar) is the sugar present in the largest amount. In an aqueous acidic environment, the C5 sugars are subsequently dehydrated to furfural.

A major difficulty with known methods for dehydration of sugars is the formation of undesirable resinous material called humins that not only leads to yield loss but can also lead to the fouling of exposed reactor surfaces and negatively impact heat transfer characteristics. The present disclosure seeks to minimize the fouling of exposed reactor surfaces, and also provide a relatively energy efficient method for removing the products produced from the hydrolysis of the sugar feedstocks.

SUMMARY OF THE DISCLOSURE

Disclosed is a process comprising:
A) contacting an aqueous feedstock comprising one or more C5 and/or C6 sugars with an acid catalyst in the presence of a water immiscible organic solvent at a temperature in the range of from 90° C. to 250° C. to form a furan derivative and a residual aqueous feedstock;
B) separating the residual aqueous feedstock from the water immiscible organic solvent;
C) optionally, isolating the furan derivative from the water immiscible organic solvent and
D) optionally, removing the residual water or impurities from the water immiscible organic solvent;

wherein the water immiscible organic solvent comprises a mixture of at least one alkyl phenol and at least one alkylated naphthalene.

The disclosure also relates to a composition comprising furfural or 5-hydroxymethyl furfural, at least one alkyl phenol, at least one alkylated naphthalene and in the range of from 0 to 5% by weight of humins.

DETAILED DESCRIPTION OF THE DISCLOSURE

The features and advantages of the present disclosure will be more readily understood, by those of ordinary skill in the art from reading the following detailed description. It is to be appreciated that certain features of the disclosure, which are, for clarity, described above and below in the context of separate embodiments, may also be provided in combination in a single element. Conversely, various features of the disclosure that are, for brevity, described in the context of a single embodiment, may also be provided separately or in any sub-combination. In addition, references to the singular may also include the plural (for example, "a" and "an" may refer to one or more) unless the context specifically states otherwise.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

As used herein:

As used herein, the term "sugar" includes monosaccharides, disaccharides, and oligosaccharides. Monosaccharides, or "simple sugars," are aldehyde or ketone derivatives of straight-chain polyhydroxy alcohols containing at least three carbon atoms. A pentose is a monosaccharide having five carbon atoms; some examples are xylose, arabinose, lyxose and ribose. A hexose is a monosaccharide having six carbon atoms; some examples are glucose and fructose. Disaccharide molecules (e.g., sucrose, lactose, and maltose) consist of two covalently linked monosaccharide units. As used herein, "oligosaccharide" molecules consist of about 3 to about 20 covalently linked monosaccharide units.

The term "Cn sugar" includes monosaccharides having n carbon atoms; disaccharides comprising monosaccharide units having n carbon atoms; and oligosaccharides comprising monosaccharide units having n carbon atoms. Thus, "C5 sugar" includes pentoses, disaccharides comprising pentose units, and oligosaccharides comprising pentose units.

The term "furan derivative" means furfural, 5-hydroxymethyl furfural, furfuryl alcohol, ethers and esters of 5-hydroxymethyl furfural or a combination thereof. In other embodiments, the furan derivative is furfural, 5-hydroxymethyl furfural or a combination thereof.

The term "hemicellulose" refers to a polymer comprising C5 and C6 monosaccharide units. Hemicellulose consists of short, highly branched chains of sugars. In contrast to cellulose, which is a polymer consisting essentially of beta-1,4-linked glucose, a hemicellulose is a polymer of five different sugars. It contains five-carbon sugars (usually D-xylose and L-arabinose) and six-carbon sugars (D-galactose, D-glucose, and D-mannose, fructose). Hemicellulose can also contain uronic acid, sugars in which the terminal carbon's hydroxyl group has been oxidized to a carboxylic acid, such as, D-glucuronic acid, 4-O-methyl-D-glucuronic acid, and D-galacturonic acid. The sugars are partially acetylated. Typically, the acetyl content is 2 to 3% by weight of the total weight of hemicellulose. Xylose is typically the sugar monomer present in hemicellulose in the largest amount.

The term "solid acid catalyst" refers to any solid material containing Brönsted and/or Lewis acid sites, and which is substantially undissolved by the reaction medium under ambient conditions.

As used herein, the term "heteropolyacid" denotes an oxygen-containing acid with P, As, Si, or B as a central atom which is connected via oxygen bridges to W, Mo or V. Some examples are phosphotungstic acid, molybdophosphoric acid.

The term "humins" refers to an amorphous byproduct that can form during the disclosed process. The formation of humins is believed to occur when the furan derivative contacts a C5 and/or C6 sugar in the aqueous phase forming an oligomeric/polymeric product. The formation of humins can lead to lower yields of the desired product and potentially foul the surfaces of the equipment used to produce the furan derivative.

The phrase "water immiscible organic solvent" refers to a composition comprising at least one alkylated phenol and at least one alkyl naphthalene. In other embodiments, the water immiscible organic solvent consists essentially of at least one alkylated phenol and at least one alkyl naphthalene. The water immiscible organic solvent forms a two-phase mixture with water at all temperatures of the process, for example, 90° C. to 250° C. and the water content of the organic solvent at 25° C. is less than 5% by weight, based on the total weight of the water immiscible organic solvent. In other embodiments, water is soluble in the water immiscible organic solvent at less than 4%, or less than 3%, or less than 2%, or less than 1%, or less than 0.5%, or less than 0.1%, wherein all percentage are weight percentages based on the total weight of the water immiscible organic solvent.

The disclosed process comprises:
A) contacting an aqueous feedstock comprising one or more C5 and/or C6 sugars with an acid catalyst in the presence of a water immiscible organic solvent at a temperature in the range of from 90° C. to 250° C. to form a furan derivative and a residual aqueous feedstock;
B) separating the residual aqueous feedstock from the water immiscible organic solvent;
C) optionally, isolating the furan derivative from the water immiscible organic solvent; and
D) optionally, removing residual water from the water immiscible organic solvent;
wherein the water immiscible organic solvent comprises a mixture of at least one alkyl phenol and at least one alkylated naphthalene.

Step A) or the process comprises contacting an aqueous feedstock comprising one or more C5 and/or C6 sugars with an acid catalyst in the presence of a water immiscible organic solvent at a temperature in the range of from 90° C. to 250° C. to form a furan derivative and a residual aqueous feedstock. The water immiscible organic solvent comprises at least one alkyl phenol and at least one alkylated naphthalene and forms a two phase mixture wherein the aqueous feedstock is one phase and the organic solvent mixture is the other phase.

The source of the aqueous feedstock comprising one or more of C5 and/or C6 sugars can be from any lignocellulosic feedstock or biomass. The lignocellulosic feedstock or biomass may be derived from a single source, or can comprise a mixture derived from more than one source; for example, biomass can comprise a mixture of corn cobs and corn stover, or a mixture of grass, leaves, bioenergy crops, agricultural residues, municipal solid waste, industrial solid waste, sludge from paper manufacture, yard waste, wood and forestry waste or a combination thereof. Specific examples of biomass include, but are not limited to, bamboo, palm, corn grain, corn cobs, crop residues such as corn husks, corn stover, corn fiber, grasses, wheat, wheat straw, barley, barley straw, hay, rice straw, switchgrass, waste paper, sugar cane bagasse, sorghum, soy, components obtained from milling of grains, trees, branches, roots, leaves, wood, wood chips, sawdust, shrubs and bushes, vegetables, fruits, flowers, and animal manure or a combination thereof. Biomass that is useful may include biomass that has a relatively high carbohydrate value, is relatively dense, and/or is relatively easy to collect, transport, store and/or handle. In some embodiments, biomass that is useful includes corn cobs, wheat straw, bamboo, palm, wood, sawdust, sugar cane bagasse or a combination thereof.

Typically, lignocellulosic feedstock or biomass is contacted with water in the presence of an acid to hydrolyze the material to the C5 and/or C6 sugars. In one embodiment, an amount of water is used which is at least equivalent to that of the lignocellulosic feedstock on a weight basis. Typically, the use of more water provides a more dilute solution of the sugars. However, minimizing the amount of water used generally improves process economics by reducing process volumes. In practical terms, the amount of water used relative to the lignocellulosic feedstock will depend on the moisture content of the feedstock, as well as the ability to provide sufficient mixing, or intimate contact, for the biomass hydrolysis to occur at a practical rate. The aqueous feedstock can have in the range of from 0.5% by weight to about 50% by weight of the C5 and/or C6 sugars, based on the total weight of the aqueous feedstock. In other embodiments, the aqueous feedstock can comprise in the range of from 1% to 40% by weight or in the range of from 1% to about 30% by weight of the C5 and/or C6 sugars. All percentages by weight are based on the total weight of the aqueous feedstock. In some embodiments, the aqueous feedstock can comprise C5 sugars, and, in other embodiments, the aqueous feedstock can comprise C6 sugars.

The aqueous feedstock is contacted with an acid catalyst. The acid catalyst is a mineral acid, a heteropolyacid, an organic acid, a solid acid catalyst, carbon dioxide in water or a combination thereof. In some embodiments, the acid catalyst is a mineral acid, for example, sulfuric acid, phosphoric acid, hydrochloric acid, or a combination thereof. In other embodiments, the acid catalyst is a heteropolyacid comprising phosphotungstic acid, molybdophosphoric acid, or a combination of these. In some embodiments, the acid catalyst is an organic acid comprising oxalic acid, formic acid, acetic acid, an alkyl sulfonic acid, an aryl sulfonic acid, a halogenated acetic acid, a halogenated alkylsulfonic acid, a halogenated aryl sulfonic acid, or a combination of these. An example of a suitable alkyl sulfonic acid is methane sulfonic acid. An example of a suitable aryl sulfonic acid is toluenesulfonic acid. An example of a suitable halogenated acetic acid is trifluoroacetic acid. An example of a suitable halogenated alkylsulfonic acid is trifluoromethane sulfonic acid. An example of a suitable halogenated aryl sulfonic acid is fluorobenzenesulfonic acid.

The solid acid catalyst is a solid acid having the thermal stability required to survive reaction conditions. The solid acid catalyst may be supported on at least one catalyst support. Examples of suitable solid acids include without limitation the following categories: 1) heterogeneous heteropolyacids (HPAs) and their salts, 2) natural or synthetic clay minerals, such as those containing alumina and/or silica (including zeolites), 3) cation exchange resins, 4) metal oxides, 5) mixed metal oxides, 6) metal salts such as metal sulfides, metal sulfates, metal sulfonates, metal nitrates, metal phosphates, metal phosphonates, metal molybdates, metal tungstates, metal borates, and 7) combinations of any members of any of these categories. The metal components of categories 4 to 6 may be selected from elements from Groups 1 through 12 of the Periodic Table of the Elements, as well as aluminum, chromium, tin, titanium, and zirconium. Examples include, without limitation, sulfated zirconia and sulfated titania. Any of the above listed solid acid catalysts are well known in the art and can be used. Some commercially available examples of solid acid catalysts can include, for example, AMBERLYST™ and DOWEX® available from Dow Chemicals (Midland, MI) (for example, DOWEX® Monosphere M-31, AMBERLYST™ 15, AMBERLITE™ 120); CG resins available from Resintech, Inc. (West Berlin, N.J.); resins such as MONOPLUS™ S 100H available from Sybron Chemicals Inc. (Birmingham, N.J.), NAFION® perfluorinated sulfonic acid polymer. NAFION® Super Acid Catalyst (a bead-form strongly acidic resin which is a copolymer of tetrafluoroethylene and perfluoro-3,6-dioxa-4-methyl-7-octene sulfonyl fluoride, converted to either the proton (H⁺), or the metal salt form) available from DuPont Company (Wilmington, DE).

The process further includes a water immiscible organic solvent, wherein the organic solvent is a mixture of at least one alkyl phenol and at least one alkylated naphthalene. The alkyl phenol is:

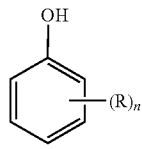

wherein R is a C1 to C16 alkyl group; and n is an integer from 1 to 5. The term "alkyl", includes straight-chain, branched or cyclic alkyl such as, for example, methyl, ethyl, n-propyl, i-propyl, or the different butyl, pentyl or hexyl isomers, including cycloalkyl. The alkyl group can be in the ortho- (o-), meta- (m-) or para- (p-) positions. In some embodiments. R is a C1 to C12 alkyl group and n is 1 or 2. In still further embodiments, R is a C1 to C6 alkyl and n is 1 or 2. Some specific embodiments include, for example, tert-butyl phenol, sec-butyl phenol, pentyl phenol, hexyl phenol, nonyl phenol and dodecyl phenol. In some embodiments, R is sec-butyl or tert-butyl. In still further embodiments, n is 1 and R is o-sec-butyl, m-sec-butyl, p-sec-butyl, o-tert-butyl, m-tert-butyl or p-tert-butyl. Mixtures of any of the various alkyl phenols can also be used.

The water immiscible organic solvent also comprises at least one alkylated naphthalene. Suitable alkylated naphthalenes can comprise:

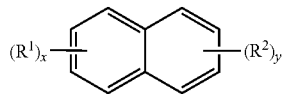

wherein $R^1$ is C1 to C6 alkyl, R2 is C1 to C6 alkyl, x is an integer from 1 to 4, and y is an integer from 0 to 4. Suitable examples of an alkylated naphthalene can include for example, any of the isomers of methyl naphthalene, dimethyl naphthalene, ethyl naphthalene, diethyl naphthalene, methyl ethyl naphthalene, propyl naphthalene, butyl naphthalene, pentyl naphthalene, hexyl naphthalene, methyl propyl naphthalene, methyl butyl naphthalene, methyl pentyl naphthalene, methyl hexyl naphthalene or a combination thereof. In other embodiments, the alkylated naphthalene is a mixture comprising various alkylated naphthalenes having a molecular weight in the range of from 128 to 548 atomic mass units. In other embodiments, the alkylated naphthalene can have a molecular weight in the range of from 128 to 296 or from 128 to 212 or from 128 to 156 atomic mass units. In still other embodiments, the alkylated naphthalene can be a mixture comprising two or more alkylated naphthalenes. Suitable alkyl naphthalenes can include, for example, AROMATIC® 200 fluid, AROMATIC® 150 fluid or AROMATIC® 150 ND fluid, all available from Exxon-Mobil. The alkyl naphthalenes may have small percentages of aromatic compounds other than naphthalenes. In some embodiments, the alkyl naphthalene may have up to 10% by weight of an alkylated benzene. In other embodiments, the alkylated naphthalene may have less than 5% by weight or less than 2% by weight or less than 1% by weight of alkylated benzenes. In some embodiments, the alkylated naphthalene is free from naphthalene.

It has been found that a combination of both an alkyl phenol and an alkylated naphthalene can provide a more efficient solvent than either alkyl phenols or alkylated naphthalenes can provide by themselves. Alkyl phenols are able to solvate a relatively larger amount of water, when compared to alkylated naphthalenes, which makes the separation of the furan derivative and recycle of the solvent problematic. Alkylated naphthalenes on their own, provide a very low water miscibility but a relatively lower partition coefficient for the furan derivative, especially for furfural. Thus, the use of alkyl naphthalenes, exclusively, as the solvent is insufficient due to the low furfural yields obtained and the insolubility of humins in pure alkylated naphthalenes, which can result in reactor fouling.

The weight ratio of the at least one alkyl phenol to the at least one alkylated naphthalene can vary in the range of from 100:1 to 1:100, wherein the weight ratio is based on the total weight of the alkyl phenol and the alkylated naphthalene. It should be noted that at relatively higher concentrations of the at least one alkylated phenol, when compared to the at least one alkylated naphthalene, and at high temperatures, for example, over 100° C. or 125° C. or 150° C. or 175° C. or 200° C., the at least one alkyl phenol may solvate greater than 5% by weight water. For example, it has been found that at around 200° C. using 100% tert-butyl phenol and a solvent to water ratio of 4:1, that a single phase system can be generated, which is not preferred. Therefore, care should be taken to use relatively lower temperatures, higher concentrations of the at least one alkylated naphthalene or both in order to maintain two liquid phases in the reactor. In other embodiments, the weight ratio of the at least one alkyl phenol to the alkylated naphthalene can be between and optionally include any of the following values: 95:5, 90:10, 80:20, 70:30, 60:40, 50:50, 40:60, 30:70, 20:80, 10:90 and 5:95. In other embodiments, the weight ratio of the alkyl phenol to alkylate naphthalene can be in the range of from 99:1 to 1:99 or from 10:90 to 90:10 or from 80:20 to 20:80 or from 70:30 to 25:75 or from 60:40 to 25:75 or from 50:50 to 25:75. In one embodiment, the water immiscible organic solvent comprises a combination of at least one alkyl phenol and at least one alkylated naphthalene. The ratios are by weight, based on the total weight of the alkylated phenol and the alkylated naphthalene. In other embodiments, the water immiscible organic solvent consists of or consists essentially of at least one alkyl phenol and at least one alkylated naphthalene. As used in this context, the phrase "consists essentially of" means that the water immiscible organic solvent contains less than 10% by weight of compounds that are not an alkyl phenol or an alkylated naphthalene, for example, the water miscible organic solvent contains less than 10% by weight of benzene or less than 10% by weight of at least one alkylated benzene. In other embodiments, the phrase consisting essentially of means that the water miscible organic solvent contains less than 5% or less than 3% or less than 2% or less than 1% by weight of compounds that are not the alkyl phenol or the alkylated naphthalene. The percentage by weight is based on the total weight of the water immiscible organic solvent.

The weight ratio of the aqueous feedstock to the water immiscible organic solvent can vary in the range from 95:5 to 5:95. In other embodiments, the ratio of the aqueous feedstock to the water immiscible organic solvent can be between 10:1 to 1:10. In still further embodiments, the ratio can be between 5:1 to 1:5 or from 2:1 to 1:2, wherein the ratios are based on the total weight of the aqueous feedstock to the weight of the water immiscible organic solvent.

The step of contacting the aqueous feedstock with an acid catalyst in the presence of the water immiscible organic solvent can take place in any reactor that is suitable for biphasic reactions. For example, the process can be carried out in a batch mode using a batch reactor or can be carried out in a continuous manner using any of the known reactors, for example, a Scheibel column, a continuous stirred tank reactor or a plug flow reactor may be utilized. In some embodiments, the contacting step occurs by mixing the various components in a vessel.

The reactor can be operated at a variety of temperatures, in the range of from 90° C. to 250° C. It has been found that if the amount of the alkyl phenol is high when compared to the amount of the alkylated naphthalene, and the temperature of the reaction is above 250° C., then the water immiscible organic solvent can begin to absorb more than 5% by weight of water. In other embodiments, the temperature of the mixture in the reactor can be in the range of from 120° C. to 225° C. or from 150° C. to 200° C. The step of contacting can take place for a sufficient time to convert at least a portion of the C5 and/or C6 sugars to the desired product. In some embodiments, the reaction time can be in the range of from 1 minute to 24 hours. In other embodiments, the reaction time can be in the range of from 5 minutes to 12 hours or from 10 minutes to 8 hours.

During the contacting step, at least a portion of the C5 and/or C6 sugars are converted to one or more furan derivatives, wherein the furan derivatives are more soluble in the water immiscible organic solvent and therefore, as the reaction progresses the concentration of the furan derivative in the organic phase increases and the concentration of the C5 and/or C6 sugar in the aqueous feedstock decreases, thereby forming a residual aqueous feedstock having a lower concentration of the sugar than the aqueous feedstock prior to the contacting step. The products of the contacting step can include, for example, one or more furan derivatives, for example furfural, 5-hydroxymethyl furfural or a combination thereof. C5 sugars will generally form furfural while C6 sugars will generally form 5-hydroxymethyl furfural. The furan derivative products are more soluble in the water immiscible organic solvent than in the aqueous phase and therefore, the water immiscible organic solvent contains a relatively higher percentage of the products than does the aqueous phase, which can minimize the formation of by-products, for example, humins.

In some embodiments salts can be added to the aqueous feedstock either before, during or after the contacting step A). The addition of salts can help to drive the furan derivatives out of the residual aqueous feedstock and into the water immiscible organic solvent. Suitable salts can include for example, sodium chloride, calcium chloride, sodium sulfate, magnesium sulfate, sodium bromide, sodium iodide, potassium chloride, potassium bromide, potassium iodide, or a combination thereof. The salts can be used in an amount in the range of from 0% to 10% based on the total weight of the aqueous feedstock. In other embodiments, the amount of salt can be in the range of from 1% to 9% or 2% to 8%. All percentages are based on the total weight of the aqueous feedstock.

The step of B) separating the residual aqueous feedstock from the water immiscible organic solvent can occur in any suitable vessel. For example, the reactor vessel can be used as the separation vessel by stopping the mixing and allowing the two phases to separate. In other embodiments, a decanter can be used to separate the residual aqueous feedstock and the water miscible organic solvent comprising the product. The contact of C5 and/or C6 sugars with the acid catalyst produces both the desired furan derivative and can also produce a byproduct called humins. The separation of the humins from both the residual aqueous feedstock and the water immiscible organic solvent comprising the furan derivative can be accomplished during the separation stage. For example, the humins can be removed by centrifugation, or by using a tricanter. In another embodiment, the humins can be removed before or after the separation of the two liquid phases by filtration.

The step of C) isolating the furan derivative from the water immiscible organic solvent can be accomplished by any means known in the art. In some embodiments, the step of isolating the furan derivative from the water immiscible organic solvent is a distillation step. It has been found that the isolation step using a mixture of the alkyl phenol and the alkylated naphthalene requires significantly less energy input to vaporize (i.e., distill) the furan derivative and residual water when compared to using a solvent consisting of alkyl phenol. This results in a much more efficient process. It is believed that since humins are less soluble in the water immiscible organic solvent, when compared to alkylated phenol, that they are easier to remove as well. In other embodiments, the furan derivative can be separated from the water immiscible organic solvent by precipitation, adsorption, or chromatography.

The process further comprises an optional step D) removing residual water or impurities from the water immiscible organic solvent. In order to increase the overall efficiency of the process, the water immiscible solvent can be purified to reuse in step A). The removal step D) can be accomplished by removing any water by distillation or removing impurities, for example, humins, by precipitation. It has been found that the disclosed water immiscible solvent tends to absorb less water when compared to a solvent system consisting of alkylated phenol. Therefore, in some embodiments, step D) may be a step of removing impurities from the water immiscible organic solvent. The water immiscible organic solvent may be recycled back to step A) with or without removal of the water or impurities. Humins that may have formed can be removed by filtration or centrifugation, as is known in the art. In still further embodiments, the water immiscible organic solvent can be distilled to provide humin-free water immiscible organic solvent.

The water immiscible organic solvent can then be discarded from the process or can be recycled using any methods known in the art for reuse in step A). In some embodiments, the water immiscible organic solvent can be added directly back into the process at step A) or can be further purified by removing any humins that may have accumulated in the water immiscible organic solvent. In other embodiments, at least a portion of the accumulated humins can be removed from the water immiscible organic solvent and then the at least partially purified water immiscible organic solvent can be returned to the process. In this way, the build-up of humins in the system can be minimized. Similarly, the residual aqueous feedstock can be discarded or can be recycled back into the process with or without any additional purification steps.

In other embodiments, the disclosure comprises a composition comprising furfural or 5-hydroxymethyl furfural, at least one alkyl phenol, at least one alkylated naphthalene and in the range of from 0 to 5% by weight of humins. In still further embodiments, the disclosure relates to compositions consisting of or consisting essentially of furfural or 5-hydroxymethyl furfural, at least one alkyl phenol, at least one alkylated naphthalene and in the range of from 0 to 5% by weight of humins Non-limiting examples of the process disclosed herein include:
1. A process comprising:
   A) contacting an aqueous feedstock comprising one or more C5 and/or C6 sugars with an acid catalyst in the presence of a water immiscible organic solvent at a temperature in the range of from 90° C. to 250° C. to form a furan derivative and a residual aqueous feedstock;
   B) separating the residual aqueous feedstock from the water immiscible organic solvent;
   C) optionally, isolating the furan derivative from the water immiscible organic solvent; and
   D) optionally, removing residual water or impurities from the water immiscible organic solvent;
   wherein the water immiscible organic solvent comprises a mixture of at least one alkyl phenol and at least one alkylated naphthalene.
2. The process of embodiment 1 wherein the acid catalyst is a mineral acid, a heteropolyacid, an organic acid, a solid acid catalyst, carbon dioxide in water or a combination thereof.
3. The process of any one of embodiments 1 or 2 wherein the alkyl phenol is:

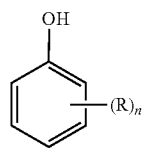

wherein R is a C1 to C16 alkyl group; and
n is an integer from 1 to 5.
4. The process of any one of embodiments 1, 2 or 3 wherein the at least one alkylated naphthalene is:

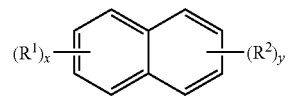

wherein $R^1$ is C1 to C6 alkyl;
$R^2$ is C1 to C6 alkyl;
x is an integer from 1 to 4; and
y is an integer from 0 to 4.
5. The process of any one of embodiments 1, 2, 3 or 4 wherein the water immiscible solvent consists essentially of at least one alkyl phenol and at least one alkylated naphthalene.
6. The process of any one of embodiments 1, 2, 3, 4 or 5 wherein the furan derivative is furfural, 5-hydroxymethyl furfural or a combination thereof.
7. The process of any one of embodiments 1, 2, 3, 4, 5 or 6 wherein the weight ratio of the at least one alkyl phenol to the at least one alkylated naphthalene is in the range of from 100:1 to 1:100.
8. The process of any one of embodiments 1, 2, 3, 4, 5, 6 or 7 wherein the aqueous feedstock comprises C5 sugars.
9. The process of any one of embodiments 1, 2, 3, 4, 5, 6, 7 or 8 wherein the step C) isolating the furan derivative from the water immiscible organic solvent is a distillation step.
10. A composition comprising furfural or 5-hydroxymethyl furfural, at least one alkyl phenol, at least one alkylated naphthalene and in the range of from 0 to 5% by weight of humins.
11. The composition of embodiments 10 wherein the composition consists essentially of furfural or 5-hydroxymethyl furfural, at least one alkyl phenol, at least one alkylated naphthalene and in the range of from 0 to 5% by weight of humins.

EXAMPLES

Unless otherwise specified, all the reagents are available from the Sigma-Aldrich Chemical Co (St. Louis, Mo.) and/or Alfa Aesar (Ward Hill, Mass.).

In the examples, the following abbreviations are used:
MN—1-methyl naphthalene
2TBP—2-tert-butyl phenol
2SBP—2-sec-butyl phenol
NP—p-nonyl phenol Example A Determination of the stability of the water immiscible solvent at reaction temperatures.

Three organic solutions were prepared by combining 1-methylnaphthalene (MN) with the desired alkyl phenol. 1 weight percent of tert-butylbenzene and sulfolane were added as dual internal standards to the organic solutions (only tert-butylbenzene was needed for quantitative analysis), making these solutions 74 weight percent 1-methylnaphthalene, 24 weight percent of the alkyl phenol and 2 weight percent internal standard. The desired alkyl phenols were 2-tertbutylphenol (2TBP), 2-sec-butylphenol (2SBP) and p-nonylphenol (NP). 1 milliliter of each solution was added to 8 different metal tube reactors. To each tube reactor was added 10 microliters (1 volume percent) of an aqueous acidic solution containing between 25 and 80 weight percent sulfuric acid.

The metal tubes were sealed and were then put into a hot oil bath (initially set at 170° C., this cooled to about 150° C. upon loading it with the 24 metal tubes) sitting atop a rotary shaker at 100 rpm. The lid to the heater/shaker was sealed and time 0 was established when the oil heated up to 158° C. The reaction temperature set point was adjusted to and maintained at 160° C. After 45 minutes, the tubes were removed from the hot oil and were quenched on ice. The oil was washed off with acetone and the samples were opened. The contents were transferred to 4 milliliter vials. 50 microliters of each reaction mixture was added to 200 microliters of tetrahydrofuran (THF) in 2 milliliter gas chromatography vials.

Each sample was analyzed using gas chromatography (GC) under the following conditions: Agilent DB-FFAP column (30 meter long×250 micron inner diameter and 0.25 micron film thickness), inlet temperature 225° C., helium pressure 1.15 kg/cm$^2$, column flow 1.5 milliliters/minute, total flow 211 milliliters/minute, split flow 204 milliliters/minute, split ratio 50:1, 1 microliter injection, detector temperature 250° C., hydrogen 35 milliliters/minute, air 350 milliliters/minute, makeup helium 35 milliliters/minute, initial oven temperature 50° C., ramp to 80° C. at 10 Celsius/minute, ramp to 200° C. at 20° C./minute, ramp to 250° C. at 10° C./minute and hold for 3 minutes.

The 2TBP and 2SBP peaks were calibrated against the two internal standards. The NP solution was an isomer of various alkyl phenols, so the sum of the areas of the various peaks was taken to represent an estimate of the total amount of p-nonylphenol. An estimated response factor was adjusted such that it gave the proper amount of NP using these 8 peaks in the non-heated control reaction mixture. This value was then used for the other heated samples.

The ratio of the remaining solvent detected after heating relative to the initial solvent before heating amount was expressed as a percentage of initial solvent for each of the acid loadings. This was used as a measure of solvent stability under the acidic conditions. The results are shown in TABLE 1.

TABLE 1

| Example No. | Weight percent sulfuric acid in aqueous solution | 2TBP (millimoles) | 2SBP (millimoles) | *NP (millimoles) | Percent of initial alkyl phenol (tert-butylbenzene internal standard) |
|---|---|---|---|---|---|
| 1 | 26.6% | 54.410 | n/a | n/a | 97% |
| 2 | 32.3% | 55.572 | n/a | n/a | 99% |
| 3 | 44.8% | 53.487 | n/a | n/a | 96% |
| 4 | 56,1% | 53.100 | n/a | n/a | 95% |
| 5 | 62.0% | 45.693 | n/a | n/a | 82% |
| 6 | 68.1% | 35.861 | n/a | n/a | 64% |
| 7 | 74.0% | 31.673 | n/a | n/a | 57% |
| 8 | 80.1% | 25.554 | n/a | n/a | 46% |
| 9 | 26.6% | n/a | 54.939 | n/a | 98% |
| 10 | 32.3% | n/a | 53.916 | n/a | 96% |
| 11 | 44.8% | n/a | 53.935 | n/a | 96% |
| 12 | 56.1% | n/a | 54.347 | n/a | 97% |
| 13 | 62.0% | n/a | 55.502 | n/a | 99% |
| 14 | 68,1% | n/a | 55.250 | n/a | 99% |
| 15 | 74.0% | n/a | 52.214 | n/a | 93% |
| 16 | 80.1% | n/a | 50.761 | n/a | 91% |
| 17 | 26.6% | n/a | n/a | 37.903 | 99% |
| 18 | 32.3% | n/a | n/a | 38.273 | 100% |
| 19 | 44.8% | n/a | n/a | 39.386 | 103% |
| 20 | 56.1% | n/a | n/a | 40.464 | 106% |
| 21 | 62.0% | n/a | n/a | 37.948 | 99% |
| 22 | 68.1% | n/a | n/a | 37.382 | 98% |
| 23 | 74.0% | n/a | n/a | 35.791 | 94% |
| 24 | 80.1% | n/a | n/a | 35.288 | 92% |

The results show that at higher acid levels, t-butyl phenol is less stable than s-butyl phenol and p-nonylphenol.

Example B

Water Uptake in a Water Immiscible Organic Solvent

An excess of water (greater than 20 wt %) was added to the organic solvents and the mixtures were vigorously agitated for several minutes. The samples were allowed to sit overnight before being separated by centrifugation at 4000 rpm for 5 min. The water content of the organic solvent samples was then measured by adding a known mass of the solvent sample to a Mettler Toledo DL31 Karl Fischer Titrator. The titrator used AQUASTAR® CombiTitrant 5 titrant and HYDRANAL® Methanol Dry solvent. Samples were run in sets of four, and the average value of the four runs is reported in TABLE 2.

TABLE 2

| Example | Phenol (wt %) | Phenol | Aromatic hydrocarbon (wt %) | Aromatic hydrocarbon | Water in organic solvent (wt %) |
|---|---|---|---|---|---|
| 25 | 5 | 2TBP | 95 | MN | 0.1 |
| 26 | 10 | 2TBP | 90 | MN | 0.2 |
| 27 | 25 | 2TBP | 75 | MN | 0.4 |
| 28 | 50 | 2TBP | 50 | MN | 1.0 |
| Comparative A | 100 | 2TBP | 0 | | 4.0 |
| Comparative B | 100 | 2TBP | 0 | | 4.2 |

The results in TABLE 2 show that the water immiscible organic solvent of the disclosure absorbs a significantly less amount of water than does 2-tert-butyl phenol as a solvent on its own.

The following methods, described below, were used in the formation of furan derivatives via batch reactors and continuous stirred tank reactors. The contents of the reactors were analyzed using the analytical methods described below.

Process Method A: Continuous Stirred Tank Reaction

The solvent and aqueous phases were pumped into a continuous stirred tank reactor consisting of a pressure vessel with a nominal volume of 100 milliliters (mL) and a working volume of approximately 55 mL. The liquid level in the reactor was maintained by a dip tube extending downward from the top of the reactor. Nitrogen was continually added to the reactor headspace. The aqueous phase contained the sugar and acid catalyst. The reactor was agitated at 700 revolutions per minute (rpm) with a pitched blade impeller. The reactor residence time was estimated by dividing the total volumetric flow rate at the reaction temperature of the liquid materials entering the reactor by the working volume of the reactor. The reactor pressure was maintained above the saturation pressure of water at the reaction temperature by a diaphragm-style back pressure regulator. Reaction samples (5-15 mL) were collected by a liquid handling device from Gilson throughout the reaction. The average furfural yield and 5-carbon (C5) sugar conversion at steady state are reported.

Process Method B: Batch Reaction

A 1 liter (L) pressure vessel was charged with a desired amount organic solvent and aqueous phase. The aqueous phase was prepared with the sugar(s) and the acid catalyst of interest. The total mass of this charge was generally around 700 grams (g). The pressure vessel was sealed and pressured to 4.83 bar (70 psig) with nitrogen. The vessel contents were agitated by two pitched blade impellers operating at 1000 rpm. The vessel was heated to 170° C. and held at this temperature for at least 1 hour. Samples were taken periodically from the vessel and analyzed.

Process Method C: Injected Batch Reaction

A 1 L pressure vessel was charged with the desired organic solvent and approximately 102 g of water and 2.4 g sulfuric acid. The aqueous xylose (24 wt %) and arabinose (16 wt %) solution was added to a piston pump. The pressure vessel was sealed and pressured to 4.83 bar (70 psig) with nitrogen. The vessel contents were agitated by two pitched blade impellers operating at 1000 rpm. The vessel was heated to 170° C. When the reactor contents reached the reaction temperature, the aqueous xylose and arabinose solution was added to the reactor through a sample line preheated to at least 100° C. The addition of the aqueous xylose and arabinose solution occurred in less than four minutes. The reaction temperature was maintained for at least 30 minutes (min). Samples were taken periodically from the vessel and analyzed.

Process Method D: Injected Batch Reaction #2

A 1 L pressure vessel was charged with the desired organic solvent. An aqueous solution of xylose, arabinose, sulfuric acid and succinic acid was added to a piston pump. The pressure vessel was sealed and pressured to 4.83 bar (70 psig) with nitrogen. The vessel contents were agitated by two pitched blade impellers operating at 1000 rpm. The vessel was heated to 170° C. When the reactor contents reached the reaction temperature, the aqueous solution was added to the reactor through a sample line preheated to at least 80° C. The addition of the aqueous solution occurred in less than four minutes. The reaction temperature was maintained for at least 30 min. Samples were taken periodically from the vessel and analyzed.

Analytical Methods

Analytical Method E

Solvent Analysis

Biphasic samples of reaction mixtures were separated and filtered. 200 microliters of the filtered organic layer and 200 microliters of internal standard solution consisting of 2 weight percent dioxane in 1-methylnaphthalene were weighed into a GC vial. The sample was thoroughly mixed and analyzed on the GC for furfural content.

An Agilent 6890 GC was used for the analysis with the following parameters: Agilent DB-FFAP column (30 meter long×250 micron inner diameter and 0.25 micron film thickness), inlet temperature 225 Celsius, helium pressure 16.4 pounds per square inch, column flow 1.5 milliliters/minute, total flow 211 milliliters/minute, split flow 204 milliliters/minute, split ratio 50:1, 1 microliter injection, detector temperature 250° C., hydrogen 35 milliliters/minute, air 350 milliliters/minute, makeup helium 35 milliliters/minute, initial oven temperature 60° C., ramp to 140° C. at 10° C./minute, ramp to 250° C. at 25° C./minute and hold for 3 minutes. The total run time was about 15.4 min. Resulting chromatograms were integrated and the raw areas, in combination with the known amount of internal standard, were used for quantitation.

Aqueous Layer 100 microliters of the filtered aqueous layer was weighed into a syringeless filter device (Whatman, UN203NPUORG) with 0.45 micron PTFE membrane. To the device was weighed 200 microliters of aqueous internal standard solution consisting of 1 weight percent dimethylsulfoxide. The two liquids were thoroughly mixed and then approximately 20 mg of $CaCO_3$ was added to the device to neutralize the acid aqueous phase. After neutralization and evolution of gas was completed, the filter insert was engaged and the filtered sample was analyzed by High Performance Liquid Chromatography (HPLC).

An Agilent 1100 series HPLC equipped with degasser, binary pump, autosampler, column heater and refractive index detector modules was used to analyze furfural and other compounds related to the production of furfural. The column used was a Bio-Rad Aminex HPX-87P 300 mm×7.8 mm column (Catalog No. 125-0098). To protect this column, the sample first passed through a cation and anion combo deashing guard column (Catalog No. 125-0118) in a stainless steel column holder (Catalog No. 125-0139) and then through a 30 mm×4.6 mm cartridge guard column (Catalog No. 125-0119) held in a stainless steel guard column holder (Catalog No. 125-0131). The cartridge guard column and the primary column were heated to 80° C., but the deashing column remained at room temperature. The refractive index detector used positive polarity and was heated as close to the column temperature as possible, which was 55° C. Pure 18.2 MΩ Millipore DI water was used as the mobile phase. The water was pumped through the column at 0.6 ml/min. A 20 microliter injection of each analytical sample was initiated for the 60 min run. Resulting chromatograms were integrated and the raw areas, in combination with the known amount of internal standard, were used for quantitation.

Controls

For each analysis, aqueous and organic control samples with known concentrations of sugars and furfural, respectively, were prepared according to the methods described previously.

Quantitation

Quantitation of these compounds using either HPLC or GC was always done by generating calibration curves for the individual analytes such that the y axis corresponded to the area ratio of the analyte divided by the area of the internal standard and the x axis corresponded to the amount of analyte divided by the amount of internal standard. The curves for each line were linear and were fit through zero. Quantification of real or control samples was done by dividing the ratio of the analyte peak area to the internal standard peak area by the slope of the calibration curve for a particular analyte and then multiplying by the amount of internal standard known to be in solution.

Analytical Method F

For these methods, the internal standards, dodecane (0.25-1 wt %) and succinic acid (0.5-1 wt %), were added to the solvent and aqueous phase before reaction. Post reaction, the aqueous and solvent layers were allowed to settle, or settling was induced by centrifugation of the samples at 4000 rpm for 3 min.

Solvent Analysis 300 microliters of the solvent phase was added to 0.45 micrometer filter type GC vials. These samples were analyzed using the solvent analysis technique from Method E or by using an Agilent 5890 GC with the following parameters: A DB-17 (30 m×0.32 mm×0.5 µm) capillary column. An inlet temperature 25° C., helium pressure 10.0 pounds per square inch (0.703 kg/cm$^2$), column flow 2.1 milliliters/minute, septum purge flow of 3.7 milliliters/minute, vent flow of 44 milliliters/min, and a 1 microliter sample injection. The flame ionization detector was operated at 250° C. with 35 milliliters/min of hydrogen flow and 350 milliliters/min of air flow.

Aqueous Analysis for Furfural

The aqueous phase was analyzed for furfural by weighing 250 microliters of an internal standard solution consisting of 0.25 wt % dioxane in 2-propanol and 50 microliter of filtered aqueous reaction sample to a filter type GC vial. This sample was then analyzed using the DB-17 GC method described above.

Aqueous Phase Sugar Analysis 38 microliters of pyridine, 200 microliters of N,O-Bis(trimethylsilyl)tifluoroacetamide, and 2 microliters of filtered aqueous sample were added to a GC vial and sealed. These vials were then heated to 60° C. for 30 min and analyzed on an Agilent 6890 GC with the following conditions: A Supelco Equity 1701: 30 m×0.25 mm×0.25 µm column running a constant He pressure of 19.9 psig. The split ratio was 15:1. The injector temperature was 260° C. and the injection volume was 2 microliters. The column oven temperature was started at 140° C., ramped to 210° C. at 6° C./min, ramped to 250° C. at 20° C./min, and then held for 4 min. cl Quantitation The same quantitation methods were used as Method E.

Analytical Method G: Octane Internal Standards

This method is the same as Method F, except for the following: 200 microliters of the solvent phase and 200 microliters of an internal standard solution, consisting of 0.65 wt % octane in aromatic 150 fluid naphthalene depleted, were massed into a filter type GC vial.

Analytical Method H

Post reaction, the aqueous and solvent layers were allowed to settle or settling was induced by centrifugation of the samples at 4000 rpm for 3 min.

Solvent Phase

The solvent phase analysis was analogous to Method F, except hydroxymethylfurfural was the analyte of interest.

Aqueous Phase

The aqueous phase was analyzed for sugars, fructose and hydroxymethylfurfural using an Agilent 1200 series HPLC with a Bio-Rad Aminex HPX-87H 300×7.8 millimeter column. The mobile phase was 5 millimolar sulfuric acid in water flowing at 0.6 mL/min. The column temperature was maintained at 40° C. Samples were prepared by adding 250 microliters of sample to 900 microliters 50:50 (volume to volume) mix of acetonitrile and water containing 1 wt % dimethyl sulfoxide. A refractive index detector was used to detect the analytes.

Sugar Conversion and Product yields were calculated using the following method:

$$\text{Conversion } (X) = 1 - \frac{C_{reactant,out}}{C_{reactant,in}}$$

The conversion calculation assumes that all of the sugar analytes are in the aqueous phase.

$$\text{Yield } (Y) = \frac{C_{product,out}}{C_{reactant,in}}$$

Both aqueous and organic phases were analyzed for product.

Example C

Process Method A and Analytical Method E (analytical) were used. The residence time of the reactor was estimated to be 4.5 minutes. The aqueous phase was 9.7% by weight xylose and 1.5% by weight arabinose. 2% by weight sulfuric acid was the catalyst, and the water immiscible organic solvent was AROMATIC™ 200 aromatic fluid with 2TBP added in various weight percentages, based on the total amount of water immiscible organic solvent listed in TABLE 3.

TABLE 3

| Example | Solvent: Aq ratio | 2TBP (wt %) | Conversion (%) | Yield (%) |
|---|---|---|---|---|
| 29 | 3.3 | 25 | 45 | 40 |
| 30 | 2.0 | 43 | 43 | 38 |
| 31 | 4.5 | 43 | 56 | 49 |
| 32 | 3.3 | 25 | 52 | 42 |
| 33 | 3.3 | 50 | 46 | 40 |
| 34 | 2.0 | 7 | 35 | 28 |
| 35 | 3.3 | 25 | 43 | 36 |
| 36 | 4.5 | 7 | 50 | 44 |
| 37 | 5.0 | 25 | 54 | 48 |
| 38 | 3.3 | 25 | 58 | 48 |
| 39 | 1.5 | 25 | 36 | 27 |

TABLE 3-continued

| Example | Solvent: Aq ratio | 2TBP (wt %) | Conversion (%) | Yield (%) |
|---|---|---|---|---|
| 40 | 2.8 | 0 | 37 | 31 |
| 41 | 3.3 | 25 | 43 | 38 |
| 42 | 3.3 | 25 | 48 | 40 |

Example D

Process Method A and Analytical Method F were used to study the kinetics of the biphasic process by varying the reaction temperature, acid concentration and residence time according to TABLE 4. The water immiscible organic phase was 25% by weight 2TBP in AROMATIC™ 200 aromatic fluid or AROMATIC™ 200 ND aromatic fluid. The water immiscible organic solvent was used at 3.25 grams of solvent per gram of aqueous phase. The aqueous phase for each of these examples contained 10% by weight xylose. The acid used was sulfuric acid and the amount in TABLE 4 is listed as the percentage by weight based on the aqueous phase.

TABLE 4

| Example | Temp (° C.) | Acid concentration (%) | Residence time (minutes) | Conversion (%) | Yield (%) |
|---|---|---|---|---|---|
| 43 | 170 | 2.0 | 2.9 | 43 | 28 |
| 44 | 170 | 2.0 | 5.9 | 60 | 38 |
| 45 | 170 | 2.0 | 10.6 | 66 | 42 |
| 46 | 170 | 2.0 | 19.0 | 82 | 53 |
| 47 | 170 | 1.0 | 2.8 | 31 | 14 |
| 48 | 170 | 1.0 | 4.4 | 46 | 93 |
| 49 | 170 | 1.0 | 7.8 | 42 | 20 |
| 50 | 170 | 1.0 | 12.0 | 60 | 29 |
| 51 | 170 | 1.0 | 31.2 | 76 | 47 |
| 52 | 170 | 3.0 | 3.2 | 49 | 30 |
| 53 | 170 | 3.0 | 7.0 | 63 | 41 |
| 54 | 170 | 3.0 | 7.0 | 63 | 42 |
| 56 | 170 | 3.0 | 15.7 | 79 | 53 |
| 57 | 180 | 1.0 | 3.0 | 62 | 30 |
| 58 | 180 | 1.0 | 7.3 | 69 | 39 |
| 59 | 180 | 2.0 | 7.8 | 76 | 47 |
| 60 | 180 | 2.0 | 20.2 | 86 | 54 |
| 61 | 150 | 1.0 | 6.4 | 22 | 12 |
| 62 | 150 | 1.0 | 13.1 | 33 | 15 |
| 63 | 150 | 1.0 | 21.3 | 39 | 19 |
| 64 | 150 | 1.0 | 6.4 | 23 | 10 |

The results in TABLES 3 and 4 show that conversion of sugars to furan derivatives in the presence of the water immiscible organic solvent readily occurs over a wide range of temperatures, acid concentrations, and residence times.

Example E

Process Method A and Analytical Method E were used to study the conversion at higher temperatures. In these examples, the ratio of water immiscible organic solvent to aqueous phase is 4:1 (wt/wt), the concentration of xylose in the aqueous phase is 10% by weight and the sulfuric acid concentration is given as a percentage by weight based on the amount of the aqueous phase. 2TBP and MN were used as the water immiscible organic solvent.

TABLE 5

| Example | T (° C.) | Residence time (minutes) | wt % phenol | acid (%) | Conversion (%) | Yield (%) |
|---|---|---|---|---|---|---|
| Comp C | 220 | 6.7 | 0 | 0.10 | 60 | 43 |
| Comp D | 220 | 6.7 | 0 | 0.07 | 59 | 41 |
| 65 | 200 | 8.9 | 25 | 0.26 | 35 | 24 |
| 66 | 200 | 8.9 | 25 | 0.19 | 35 | 23 |

The results in TABLE 5 show that even at relatively high temperatures, the water immiscible organic solvent provides good yields at low conversions.

Example F

Process method D and Analytical Methods F and G were used to study effects of sulfuric acid, solvent to aqueous phase ratio, and solvent solvent used in each case was AROMATIC™ solvent, with the grade listed in TABLE 6. ND means a naphthalene depleted grade, which contains low levels of naphthalene.

TABLE 6

| | Example | | | | |
|---|---|---|---|---|---|
| | 67 | 68 | 69 | 70 | 71 |
| Phenol | 2TBP | 2TBP | 2TBP | 2TBP | 2SBP |
| amt (g) | 244.0 | 138.1 | 135.2 | 133.2 | 133.2 |
| wt % | 43 | 25 | 25 | 25 | 25 |
| Alkylated naphthalene | 200 | 200 | 200 ND | 150 ND | 200 ND |
| amt (g) | 327.1 | 401.0 | 400.0 | 399.8 | 407.6 |
| wt % | 57 | 75 | 75 | 75 | 75 |
| Solvent: Aqueous ratio (g/g) | 4.5 | 3.2 | 3.2 | 3.2 | 3.2 |
| Xylose (g) | 27.19 | 33.44 | 33.57 | 33.09 | 33.53 |
| Arabinose (g) | 1.26 | 0.00 | 0.00 | 0.00 | 0.00 |
| Water (g) | 95.49 | 129.20 | 127.30 | 127.37 | 129.06 |
| Sugar (wt % in water) | 22 | 20 | 20 | 20 | 20 |
| Sulfuric acid (g) | 2.56 | 3.34 | 3.39 | 3.31 | 3.35 |
| Succinic acid (g) | 1.32 | 1.47 | 1.37 | 1.31 | 1.32 |
| Conversion at maximum yield (%) | 96 | 91 | 96 | 96 | 95 |
| Maximum yield (%) | 63 | 64 | 64 | 63 | 65 |
| Analytical Method | F | F | F | G | F |

Example G

Process methods C and Analytical Method E were used to study the effect of various alkyl phenols on the conversion and yield.

TABLE 7

| | Example | |
|---|---|---|
| | 72 | 73 |
| Phenol | dodecyl phenol | nonyl phenol |
| amt (g) | 250.0 | 210.0 |
| wt % | 45 | 37.5 |
| AROMATIC™ 200 amt (g) | 310.0 | 350.0 |

TABLE 7-continued

| | Example | |
|---|---|---|
| | 72 | 73 |
| wt % | 55 | 62.5 |
| Solvent: Aqueous ratio (g/g) | 4.1 | 4.1 |
| Xylose (g) | 7.80 | 7.80 |
| Arabinose (g) | 5.23 | 5.24 |
| Water (g) | 121.59 | 122.50 |
| Sugar (wt % in water) | 10 | 10 |
| Sulfuric acid (g) | 2.41 | 2.42 |
| Conversion at maximum yield (%) | 98 | 98 |
| Maximum yield (%) | 20 | 64 |

Example H

Process Method D and Analytical Method H were used to show that C6 sugars could be used to form hydroxymethylfurfural.

TABLE 8

| | Example 74 |
|---|---|
| Phenol | 2TBP |
| amt (g) | 135.2 |
| wt % | 25 |
| Alkylated naphthalene | AROMATIC ™ 200 ND |
| Amt (g) | 400.1 |
| wt % | 75 |
| Solvent: Aqueous ratio (g/g) | 3.3 |
| Fructose (g) | 33.55 |
| Water (g) | 127.55 |
| Sugar (wt % in water) | 20 |
| Sulfuric acid (g) | 3.38 |
| Succinic acid (g) | 1.36 |
| Conversion at maximum yield (%) | 90 |
| Maximum yield (%) | 55 |

Example I

Water Uptake in Organic Solvents and Modeling Data

The results of the water uptake from the Karl Fischer Titration experiments, shown in example B, were used to determine the water content in the organic solvent entering the distillation column. A second-order polynomial equation provided an accurate fit to the experimental data and allowed for interpolation between data points.

ASPEN Calculations for Heat Duty

Modeling of the energy used for the separation of furfural from the organic solvent was performed in ASPEN Plus v7.3 using the RadFrac block to simulate distillation. The liquid-liquid equilibrium was calculated using the nonrandom, two-liquid (NRTL) model, and the vapor-liquid equilibrium was modeled using the Peng-Robinson equation of state. The Design Institute for Physical Properties (DIPPR) database method was used to calculate the enthalpy. The mixture densities were calculated from the mole fraction average of the pure component liquid molar volumes. The modeled operating conditions of the distillation column were set to approximate a furfural feed of 1000 kg/hr and an organic solvent rate of 48077 kg/hr, so that 95% of the furfural was removed overhead, the reboiler temperature was modeled at 170° C., and the column was always run under vacuum. The phrase "calculated heat duty" means the amount of energy required for the separation of the furfural/water mixture and includes the energy required to preheat the feed from 30° C. to the desire preheat temperature and the heat added in the column reboiler as determined by the Aspen modeling. A second-order polynomial equation provided an accurate fit to the model results and allowed for interpolation between output points. The results are shown in Table 9.

TABLE 9

| | | | Amount | Distillation Conditions | | | Calculated |
|---|---|---|---|---|---|---|---|
| Ex | 2TBP (wt %) | 1MN (wt %) | of water (wt %) by KFT | Water (kg/hr) | Feed Preheat (° C.) | Column Pressure (psia) | Heat Duty (MJ/kg furfural) |
| 75 | 5 | 95 | 0.1 | 47.1 | 140 | 2.2 | 14.3 |
| 76 | 10 | 90 | 0.2 | 76.9 | — | — | 14.4** |
| 77 | 25 | 75 | 0.4 | 192 | — | — | 15.2** |
| 78 | 50 | 50 | 1.0 | 472 | 120 | 2.7 | 18.0 |
| 79 | 60 | 40 | 1.5* | 703 | 120 | 2.8 | 19.8 |
| 80 | 70 | 30 | 2.0* | 949 | 120 | 2.9 | 21.7 |
| 81 | 80 | 20 | 2.6* | 1236 | 120 | 3.0 | 23.9 |
| 82 | 100 | 0 | 4.0 | 1910 | 80 | 4.0 | 29.6 |

*Estimated from a second-order polynomial fit to the Karl Fischer titration data.
**Estimated from a second-order polynomial fit to the Aspen calculation for heat duty.

The results from Table 9 show significantly lower calculated heat duty for water immiscible organic solvents containing both the alkyl phenol and the alkylated naphthalene when compared to a solvent consisting of a pure alkyl phenol.

What is claimed is:

1. A process comprising:
   A) contacting an aqueous feedstock comprising one or more C5 and/or C6 sugars with an acid catalyst in the presence of a water immiscible organic solvent at a temperature in the range of from 90° C. to 250° C. to form a furan derivative and a residual aqueous feedstock;
   B) separating the residual aqueous feedstock from the water immiscible organic solvent;
   C) optionally, isolating the furan derivative from the water immiscible organic solvent; and
   D) optionally, removing residual water or impurities from the water immiscible organic solvent;
   wherein the water immiscible organic solvent comprises a mixture of at least one alkyl phenol and at least one alkylated naphthalene.

2. The process of claim 1 wherein the acid catalyst is a mineral acid, a heteropolyacid, an organic acid, a solid acid catalyst, carbon dioxide in water or a combination thereof.

3. The process of claim 1 wherein the alkyl phenol is:

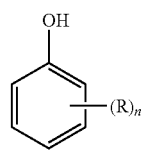

wherein R is a C1 to C16 alkyl group; and
n is an integer from 1 to 5.

4. The process of claim 1 wherein the at least one alkylated naphthalene is:

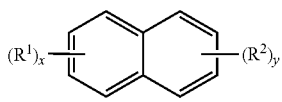

wherein $R^1$ is C1 to C6 alkyl;
$R^2$ is C1 to C6 alkyl;
x is an integer from 1 to 4; and
y is an integer from 0 to 4.

5. The process of claim 1 wherein the water immiscible organic solvent consists essentially of at least one alkyl phenol and at least one alkylated naphthalene.

6. The process of claim 1 wherein the furan derivative is furfural, 5-hydroxymethyl furfural or a combination thereof.

7. The process of claim 1 wherein the weight ratio of the at least one alkyl phenol to the at least one alkylated naphthalene is in the range of from 100:1 to 1:100.

8. The process of claim 1 wherein the aqueous feedstock comprises C5 sugars.

9. The process of claim 1 wherein the step of C) isolating the furan derivative from the water immiscible organic solvent is a distillation step.

10. A composition comprising furfural or 5-hydroxymethyl furfural, at least one alkyl phenol, at least one alkylated naphthalene and in the range of from 0 to 5% by weight of humins.

11. The composition of claim 10 consisting essentially of furfural or 5-hydroxymethyl furfural, at least one alkyl phenol, at least one alkylated naphthalene and in the range of from 0 to 5% by weight of humins.

* * * * *